United States Patent
Tanaka et al.

(10) Patent No.: US 9,073,054 B2
(45) Date of Patent: Jul. 7, 2015

(54) FLUID-CONTROLLING DEVICE FOR MICROCHIP AND USE THEREOF

(71) Applicant: RIKEN, Saitama (JP)

(72) Inventors: Yo Tanaka, Kobe (JP); Hiroki Ueda, Kobe (JP)

(73) Assignee: Riken, Saitama (JP)

(*) Notice: Subject to any disclaimer, the term of this patent is extended or adjusted under 35 U.S.C. 154(b) by 36 days.

(21) Appl. No.: 13/933,160

(22) Filed: Jul. 2, 2013

(65) Prior Publication Data
US 2014/0010735 A1 Jan. 9, 2014

(30) Foreign Application Priority Data

Jul. 5, 2012 (JP) .................................. 2012-151915
Jun. 18, 2013 (JP) .................................. 2013-127810

(51) Int. Cl.
*B01L 3/00* (2006.01)
*F04B 43/02* (2006.01)
(Continued)

(52) U.S. Cl.
CPC ....... *B01L 3/50273* (2013.01); *B01L 3/502707* (2013.01); *B01L 3/502738* (2013.01); *B01L 3/569* (2013.01); *B01L 2200/082* (2013.01); *B01L 2300/0816* (2013.01); *B01L 2300/12* (2013.01); *B01L 2400/0481* (2013.01);
(Continued)

(58) Field of Classification Search
CPC .......... B01L 3/50273; B01L 3/502707; B01L 3/502738; B01L 2200/082; B01L 2300/0816; B01L 2400/0481; B01L 3/569; F16K 99/0015; F16K 2099/0094; F16K 2099/0084; F16K 2099/008; F04B 43/021; F04B 43/046
See application file for complete search history.

(56) References Cited

U.S. PATENT DOCUMENTS 4,938,742 A * 7/1990 Smits .............................. 604/67
5,718,567 A * 2/1998 Rapp et al. .................... 417/395
(Continued)

FOREIGN PATENT DOCUMENTS

JP 2005-013980 1/2005
JP 2005-083510 3/2005
(Continued)

OTHER PUBLICATIONS

Morishima, K. et al., "Development of Micro Needle-Head Slide Valve Unit for Microfluidic Devices," 7th International Conference on Miniaturized Chemical and Biochemical Analysts Systems, Oct. 509, 2003, pp. 1033-1036.
(Continued)

*Primary Examiner* — Lore Jarrett
(74) *Attorney, Agent, or Firm* — Harness, Dickey & Pierce

(57) ABSTRACT

The present invention relates to a fluid-controlling device (10) for incorporation into a microchip (100). The fluid-controlling device (10) of the present invention includes: a glass substrate (1b) having a hollow part (3) provided therein, the hollow part (3) having a first opening (3') extending to a top surface of the glass substrate (1b) and a second opening (4) extending to a bottom surface of the glass substrate (1b); and a glass sheet (2) being 1 to 50 μm in thickness and sealing the first opening (3'), the glass sheet (2) changing a volume of the hollow part (3) when a position of the glass sheet (2) is displaced by and according to a pressing force applied toward the hollow part (3). With use of the present invention, it is possible to provide a versatile microchip system being usable under a high pressure and being usable with an organic solvent.

4 Claims, 12 Drawing Sheets

(51) Int. Cl.
*F04B 43/04* (2006.01)
*F16K 99/00* (2006.01)

(52) U.S. Cl.
CPC ............. *F04B43/021* (2013.01); *F04B 43/046* (2013.01); *F16K 99/0015* (2013.01); *F16K 2099/008* (2013.01); *F16K 2099/0084* (2013.01); *F16K 2099/0094* (2013.01)

(56) References Cited

U.S. PATENT DOCUMENTS

| | | | | |
|---|---|---|---|---|
| 5,876,187 | A * | 3/1999 | Afromowitz et al. | 417/322 |
| 6,227,809 | B1 * | 5/2001 | Forster et al. | 417/53 |
| 6,227,824 | B1 * | 5/2001 | Stehr | 417/540 |
| 7,217,395 | B2 * | 5/2007 | Sander | 422/503 |
| 2008/0017306 | A1 * | 1/2008 | Liu et al. | 156/297 |
| 2010/0135826 | A1 * | 6/2010 | Higashino et al. | 417/244 |
| 2010/0254832 | A1 | 10/2010 | Nakazawa | |

FOREIGN PATENT DOCUMENTS

| | | |
|---|---|---|
| JP | 2005-283331 | 10/2005 |
| JP | 2005-308200 | 11/2005 |
| JP | 2005-337415 | 12/2005 |
| JP | 2008-196481 | 8/2008 |
| JP | 2009-115755 | 5/2009 |
| JP | 2012-087006 | 5/2012 |

OTHER PUBLICATIONS

Jang, K. et al., "An efficient surface modification using 2-mathracryloyloxyethyl phosphorylcholine to control cell attachment via photochemical reaction in a microchannel," Lab Chip, 2010, pp. 1937-1945.

Unger, M. et al., "Monolithic Microfabricated Valves and Pumps by Multilayer Soft Lithography," Science, vol. 288, Apr. 7, 2000, pp. 113-116.

Gu, W. et al., "Computerized microfluidic cell culture using elastomeric channels and Braille displays," PNAS, vol. 101, No. 45, Nov. 9, 2004, pp. 15861-15866.

Kikutani, Y. et al., "Circulation microchannel for liquid-liquid microextraction," Microchim Acta, 164, 2009, pp. 241-247.

Abate, A.R. et al., "Glass coating for PDMS microfluidic channels by sol-gel methods," Lab Chip, 8, 2008, pp. 516-518.

* cited by examiner (a)

(b)

(a)

(b)

(c)

RELATION BETWEEN PUMP FREQUENCY AND DISCHARGE RATE (a)

(b)

US 9,073,054 B2

FLUID-CONTROLLING DEVICE FOR MICROCHIP AND USE THEREOF

This Nonprovisional application claims priority under 35 U.S.C. §119(a) on Patent Applications No. 2012-151915 filed in Japan on Jul. 5, 2012 and No. 2013-127810 filed in Japan on Jun. 18, 2013, the entire contents of which are hereby incorporated by reference.

FIELD OF THE INVENTION

The present invention relates to (i) a fluid-controlling device to be incorporated into a microchip having a minute flow channel and (ii) a use of the fluid-controlling device.

BACKGROUND OF THE INVENTION

A substrate having a flow channel of 100 µm or less processed by a microfabrication technique used for semiconductor is generally called "microchip", and attention has been recently focused on micro-nanochemistry (micro-nanotechnology) of integrating various kinds of chemical and/or biochemical processes, such as analysis, synthesis, and cellular experiment, using such a substrate.

In order to define a flow direction of a fluid through a flow channel of a microchip and to control a flow of the fluid, a mechanical fluid-controlling device, such as a valve or a pump, is provided on a flow channel. Japanese Patent Application Publication No. 2005-083510 (published on Mar. 31, 2005) discloses a slide-type valve that uses slidable glass substrates to switch back and forth between several flow channels. Japanese Patent Application Publication No. 2005-013980 (published on Jan. 20, 2005) and K. Morishima et al. Proc. Micro Total Analysis Systems 2003: 1033-1036 (2003) disclose devices in which a flow in a flow channel is stopped by a needle-type metallic pin inserted into the flow channel.

The valve disclosed in Japanese Patent Application Publication No. 2005-083510 is superior in that the valve involves very little dead volume. Despite such an advantage, this valve has the following problems. That is, the valve requires movement of a glass substrate itself and thus limits a design of a flow channel, resulting in difficulty in juxtaposition and automatization of the valve. Further, the valve has difficulty in being used with an organic solvent and difficulty in being used under a high pressure exceeding 100 kPa. This is because hydrophobic modification with a fluorine coating agent or the like is applied on gaps besides the glass substrates in order to prevent leakage of water through the gaps.

On the contrary, the device described in Japanese Patent Application Publication No. 2005-013980 and the device described in K. Morishima et al. Proc. Micro Total Analysis Systems 2003: 1033-1036 (2003) are each able to block a flow channel at a single point and can be relatively easily juxtaposed and automatized, as compared to the valve described in Japanese Patent Application Publication No. 2005-083510. However, the device described in Japanese Patent Application Publication No. 2005-013980 and the device described in K. Morishima et al. Proc. Micro Total Analysis Systems 2003: 1033-1036 (2003) inevitably involve the formation of a gap between a needle and a glass, and thus requires hydrophobic modification on such a gap. This results in the same problem as in Japanese Patent Application Publication No. 2005-083510.

Since glass is an extremely firm material, it is not easy to construct a fluid-controlling device with glass, and it is very difficult to mount a glass fluid-controlling device on a glass substrate. In view of this, a polymeric material typified by polydimethylsiloxane (PDMS) has been recently used as a material for a fluid-controlling device to be used for a microchip. PDMS is very inexpensive, is easy to be processed, and is rich in bendability. A microvalve mechanism as shown in FIG. 12 is known in which a PDMS fluid element chip 12, having a circular hollow part 13 and a microflow channel extending across the circular hollow part 13, is provided so as to face a glass substrate 11 (Japanese Patent Application Publication No. 2005-308200 (published on Nov. 4, 2005). The microvalve mechanism is arranged such that the fluid element chip 12 is deformed by application of pressure from a pressing member 19 so that the circular hollow part 13 permits passage and blocking of a fluid through the microflow channel.

SUMMARY OF THE INVENTION

PDMS or the like elastic material is rich in bendability and is therefore less likely to be broken when locally pressed. For this reason, PDMS is suitably used as a material for a fluid-controlling device for microchip. Despite such an advantage, PDMS dissolves in organic solvent, which results in difficulty for PDMS in being used for a system handling an organic solvent. Passage of a fluid through a minute flow channel formed in a microchip requires application of a high pressure to the microchip. A microchip made of PDMS would cause leakage of a fluid from a flow channel when such a high pressure is applied to the microchip. Further, PDMS requires a molding process. For this reason, PDMS is not suitable for mass production of microchips.

PDMS is rich in bendability and has properties of being naturally adsorbed to glass. Therefore, if PDMS and the glass substrate are positioned very close to each other, a situation where PDMS and the glass substrate are inherently bonded to each other occurs due to sag caused by self weight of PDMS and natural adsorption of PDMS to glass. For example, in the case of using the arrangement shown in FIG. 12, the circular hollow part 13 needs to be not less than 50 µm in height. The circular hollow part 13 of less than 50 µm in height would cause the PDMS 12 to be bonded to the glass substrate 11 before the microvalve mechanism is put to use, and requires a time for restoration of the PDMS 12 to its original position. This results in failure to achievement of an intended operation. Consequently, it can be said that the microvalve mechanism disclosed in Japanese Patent Application Publication No. 2005-308200 is disadvantageous in terms of dead volume and a response speed. Also, it can be said that the use of a polymeric material for a fluid-controlling device for microchip is problematic in terms of physical/chemical durability and applicability.

The present invention has been attained to solve the above problems, and an object of the present invention is to provide a versatile microchip system being usable under a high pressure and being usable with an organic solvent.

In order to solve the above problems, a fluid-controlling device of the present invention is arranged, for realization of its incorporation into a microchip, to include: a glass substrate having a hollow part provided therein, the hollow part having a first opening extending to a top surface of the glass substrate and a second opening extending to a bottom surface of the glass substrate; and a glass sheet being 1 µm to 50 µm in thickness and sealing the first opening, the glass sheet changing a volume of the hollow part when a position of the glass sheet is displaced by and according to a pressing force applied toward the hollow part.

A glass sheet provided in a fluid-controlling device of the present invention has durability which is sufficient for use in the fluid-controlling device for microchip, and the glass sheet therefore does not suffer from breakage or leakage caused by material fatigue even after local pressure is repeatedly applied to the glass sheet at a high speed. This allows the fluid-controlling device of the present invention to function as a microactuator that generates an intended flow of a fluid in a microflow channel formed by coupling to a channel substrate. Since the fluid-controlling device of the present invention is not composed of non-glass materials, it is usable with an organic solvent and suffers from no leakage upon application of a high pressure (several megapascals), as a matter of course. That is, the fluid-controlling device of the present invention does not have the aforementioned disadvantages in physical/chemical durability and practical application, as compared to a fluid-controlling device for microchip which device uses PDMS or the like polymeric material.

Further, glass will not sag by its own weight and will not be naturally adsorbed to the glass substrate. That is, the above arrangement allows the fluid-controlling device of the present invention to attain an extremely small dead volume (i.e. the volume of the hollow part) and to require no time for restoration of the position of the glass sheet to its predetermined position. Consequently, when used as a valve, the fluid-controlling device of the present invention can avoid mixture of a fluid and generation of a fluid flow in the inverse direction and facilitate the implementation of an intended operation.

A fluid-controlling device of the present invention is preferably arranged such that the glass sheet seals the second opening when the glass sheet is pressed toward the hollow part.

With the above arrangement, the fluid-controlling device of the present invention can stop a flow of a fluid in a microflow channel joined to the second opening, thus being capable of serving as a switching valve. A fluid-controlling device of the present invention having the above arrangement allows the glass sheet to seal the second opening, provided that a distance between an upper end of the first opening and an upper end of the second opening 4 is in a range from 1 μm to 100 μm, and that the diameter of the first opening is in a range from 1 mm to 5 mm.

A fluid-controlling device of the present invention may be arranged to further include a pressing section that presses, toward the hollow part, the glass sheet sealing the first opening. In addition, in order to increase a response speed, a fluid-controlling device of the present invention is preferably arranged such that the pressing section is a piezo-driven actuator.

A microchip of the present invention includes: the aforementioned fluid-controlling device; and a channel substrate having a microflow channel provided thereon, the microflow channel being communicated with the hollow part provided in the fluid-controlling device.

The microchip of the present invention is arranged such that the fluid-controlling device is laminated to the channel substrate. With this arrangement, the microflow channel, except for both ends thereof, is separated from outside, and the hollow part is separated from outside, except that the hollow part is communicated with the microflow channel via a joint part. With use of the above arrangement, the hollow part of the fluid-controlling device is communicated with the microflow channel. As a result, it is possible to generate and stop a flow of a fluid charged into the microflow channel.

The microchip of the present invention is preferably arranged such that the channel substrate is a glass substrate. This allows the microchip of the present invention to be entirely made of glass. A microchip into having a fluid-controlling device incorporated thereinto and being composed of only glass has not been attained hitherto.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 1 is a view showing an essential configuration of a microchip in accordance with an embodiment of the present invention and overall configurations of the microchip.

FIG. 2 is a cross-sectional view of a fluid-controlling device for microchip, in accordance with an embodiment of the present invention.

FIG. 3 is a plan view and a cross-sectional view of a microchip in accordance with an embodiment of the present invention.

FIG. 4 is a plan view of a microchip in accordance with an embodiment of the present invention.

FIG. 5 is a schematic view of a microchannel provided in a microchip in accordance with an embodiment of the present invention.

FIG. 6 is a view showing a valve function of a fluid-controlling device for microchip in accordance with an embodiment of the present invention.

FIG. 7 is a view showing a valve function of a fluid-controlling device for microchip in accordance with an embodiment of the present invention.

FIG. 8 is a view showing a valve function of a fluid-controlling device for microchip in accordance with an embodiment of the present invention.

FIG. 9 is a view showing a pump function of a fluid-controlling device for microchip in accordance with an embodiment of the present invention.

FIG. 10 is a view showing a pump function of a fluid-controlling device for microchip in accordance with an embodiment of the present invention.

FIG. 11 is a view showing a pump function of a fluid-controlling device for microchip in accordance with an embodiment of the present invention.

FIG. 12 is a view showing a conventional technique.

DESCRIPTION OF THE EMBODIMENTS

With reference to the drawings, the following will describe (i) embodiments of a fluid-controlling device of the present invention and (ii) embodiments of a microchip into which the fluid-controlling device is incorporated.

[1. Microchip]

Figure 1:
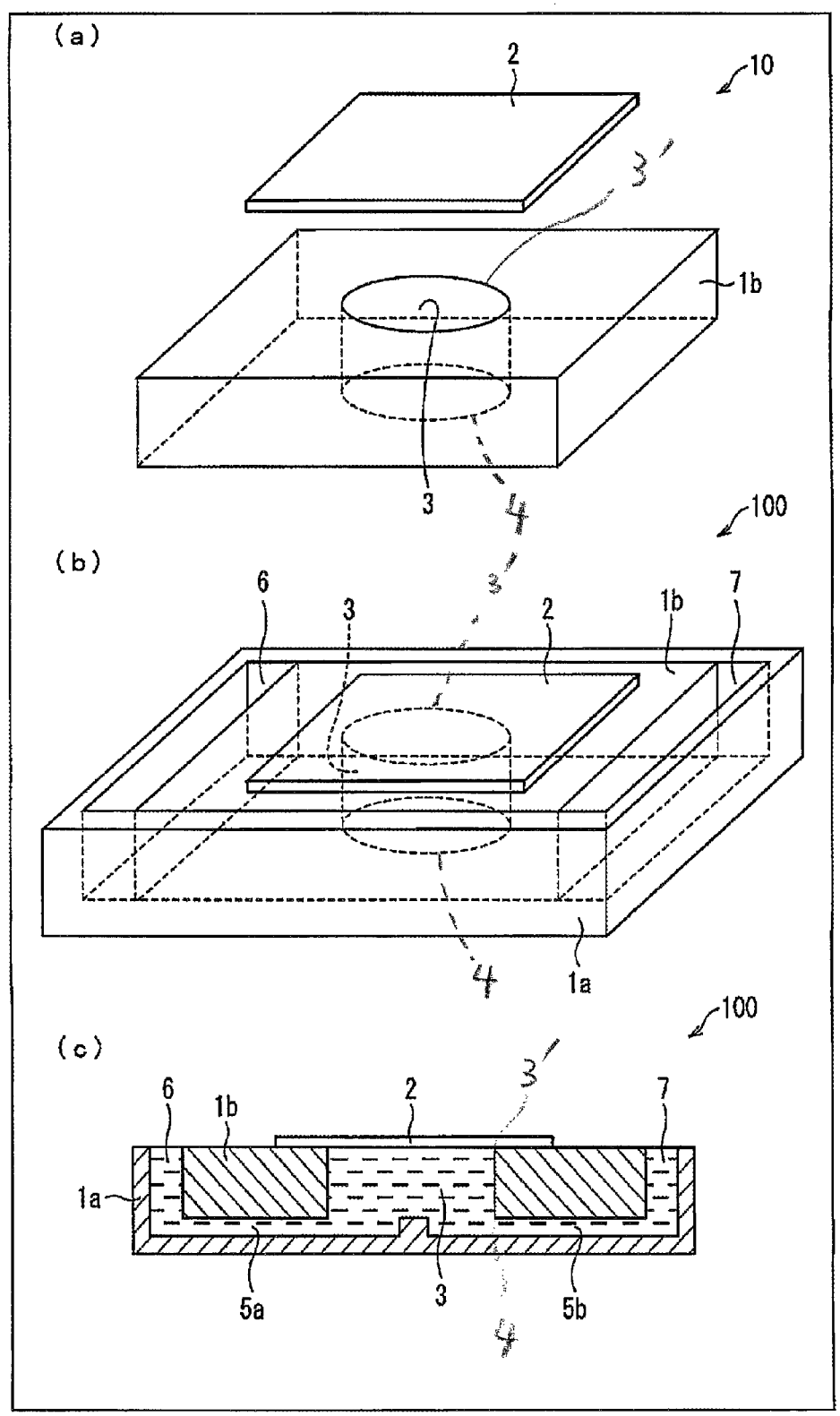
FIG. 1
Figure 2:
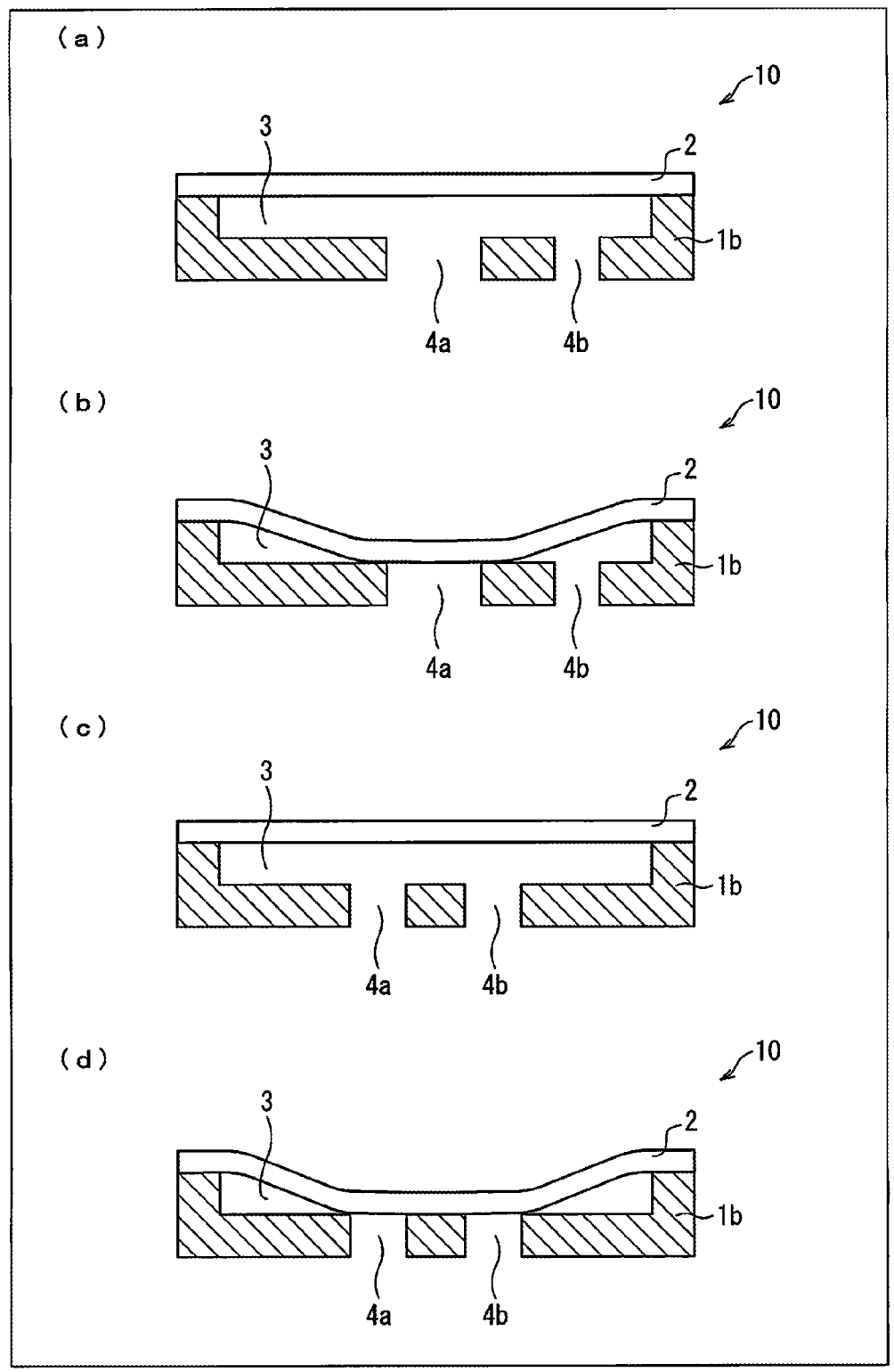
FIG. 2
Figure 3:
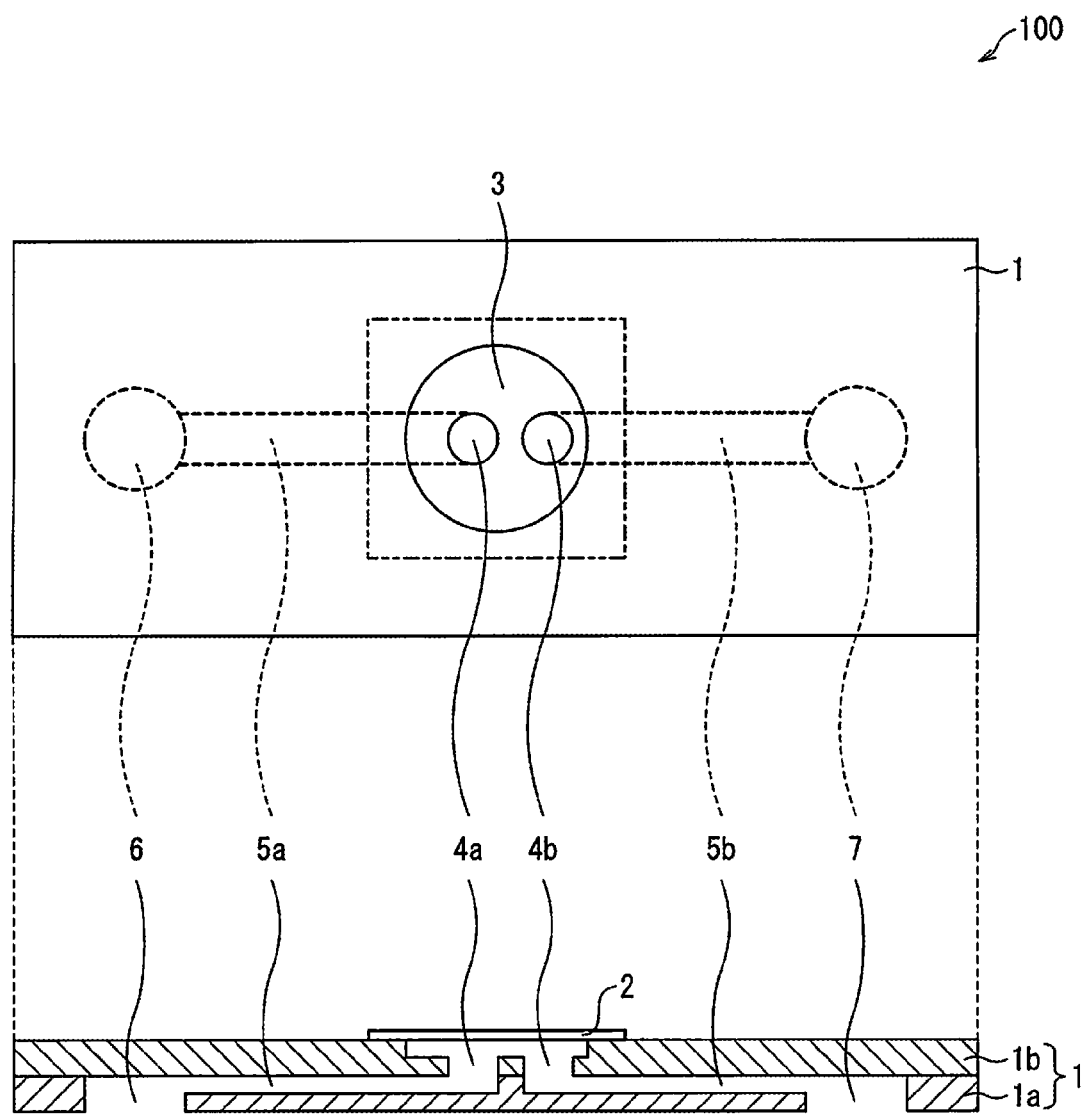
FIG. 3

The following will describe the embodiments of the present invention with reference to FIGS. 1 through 3. FIG. 1 shows an oblique view ((a) of FIG. 1) of a microactuator 10 that is an essential part of a microchip 100 in accordance with an embodiment of the present invention and also shows an oblique view ((b) of FIG. 1) and a cross-sectional view ((c) of FIG. 1) of an overall configuration of the microchip 100.

The microchip 100 in accordance with the present embodiment includes: a substrate 1 including a channel substrate 1a and a glass substrate 1b; and a glass sheet 2, wherein the substrate 1 and the glass sheet 2 are opposed to each other. The microchip 100 is formed by laminating the substrate 1 and the glass sheet 2 to each other ((b) and (c) of FIG. 1). The glass substrate 1b has a hollow part 3 including: an opening (first opening 3') provided on a side of a top surface of the substrate 1; and an opening provided on a side of a bottom surface of the substrate 1. The first opening 3' is sealed by the glass sheet 2 ((a) and (b) of FIG. 1). Further, the channel substrate 1a has fine grooves (microchannels) 5a and 5b formed on a surface thereof ((c) of FIG. 1). (c) of FIG. 1 is a cross-sectional view of the microchip 100, viewed along a plane including the microchannels 5a and 5b, which are omitted in (b) of FIG. 1.

The microchannels 5a and 5b define a flow channel of the microchip 100 in accordance with the present embodiment. In (b) of FIG. 1, an inlet section 6 is a section that retains a fluid to be infused into the microchannel 5a, and an outlet section 7 is a section that retains a fluid to be discharged from the microchannel 5b. The inlet section 6 and the outlet section 7 are formed as gaps between the channel substrate 1a and the glass substrate 1b when the channel substrate 1a and the glass substrate 1b are assembled to each other. However, the inlet section 6 and the outlet section 7 need only to be formed in the channel substrate 1a, independently from the glass substrate 1b, and the inlet section 6 and the outlet section 7 may be of any shapes without particular limitation. At least one of the inlet section 6 and the outlet section 7 is connectable to a pump through which the microchannel 5 is charged with a fluid.

The assembly of the channel substrate 1a and the glass substrate 1b causes the hollow part 3 (i) to be jointed to the microchannels 5a and 5b via a second opening 4 provided on the bottom surface of the glass substrate 1b and (ii) to be communicated with the inlet section 6 and the outlet section 7 via the microchannels 5a and 5b, respectively. While the hollow part 3 is communicated with only the inlet section 6 and the outlet section 7, the hollow part 3 is separated from the outside of the microchip 100.

Further, the microchip 100 in accordance with the present embodiment has check valves (not illustrated) provided in the microchannels 5a and 5b. This defines a flow direction of a fluid flown from the inlet section 6 to the outlet section 7 via the microchannels 5a and 5b.

When a pressing force toward the hollow part 3 is applied to the glass sheet 2 with the inlet section 6 and the outlet section 7, the microchannels 5a and 5b, and the hollow part 3 charged with a fluid, the glass sheet 2 is displaced. This decreases the volume of the hollow part 3, thus moving the fluid filled in the hollow part 3 toward the microchannel 5b. It should be noted that the fluid filled in the hollow part 3 is not caused to move toward the microchannel 5a since the microchip 100 in accordance with the present embodiment is arranged such that the check valve for defining a flow direction of a fluid is provided in the microchannel 5a, as described previously.

When the pressing force is released, the fluid filled in the microchannel 5a is moved into the hollow part 3. This restores the volume of the hollow part 3 to its original volume. Alternatively, when the glass sheet 2 returns itself to its original position, the volume of the hollow part 3 is restored to its original volume, and the fluid filled in the microchannel 5a is moved into the hollow part 3. As in the above case, the fluid filled in the microchannel 5b is not caused to move toward the hollow part 3 since the microchip 100 in accordance with the present embodiment is arranged such that the check valve for defining a flow direction of a fluid is provided in the microchannel 5b, as described previously.

The above description has dealt with the arrangement in which the check valves are used to define the flow direction of a fluid flown in the microchannels. Alternatively, the microchip 100 in accordance with the present embodiment may be arranged such that the microchannels 5a and 5b are configured to vibrate a fluid, without having the check valves provided in the microchannels 5a and 5b.

The fluid supplied to the microchip 100 may be a gas or a liquid, but the fluid is preferably a liquid when used in biochemical analysis or the like by microtechnology. Alternatively, in a case where the microchip is entirely made of glass, the fluid may be any solution or solvent required to form a desired structure (e.g. a sample analyzing section or a sample separating section) on a microflow channel.

The channel substrate 1a may be composed of a material suitable for use in analysis. For example, the channel substrate 1a may be a substrate having insulation property (e.g. a silicon substrate having an insulating material, such as an oxide film, formed on a surface thereof, a quartz substrate, an aluminum oxide substrate, a glass substrate, and a plastic substrate) or a light-transmitting substrate (e.g. a glass substrate, a quartz substrate, and a substrate made of a light-transmitting resin. In a case where the microchip 100 is used for a substance detection using chemiluminescence, the channel substrate 1a may be made of a glass or plastic material exhibiting less fluorescence and having transparency (e.g. polyimide, polybenzimidazole, polyether ether ketone, polysulfone, polyetherimide, polyethersulfone, and polyphenylene sulfide). In a case where the microchip needs to be entirely made of glass, the channel substrate 1a is made of glass, as a matter of course.

Further, the channel substrate 1a arranged as above can be processed by any of the following direct processing methods including, for example, machine processing, laser processing, injection molding using a mold, press molding, and casting. In a case where the channel substrate 1a is made of glass, the channel substrate 1a can be suitably processed by photolithography or etching.

It is preferable that the channel substrate 1a is approximately 1 mm to 10 mm in thickness for use in the microchip 100. The glass substrate 1b may be identical in thickness to the channel substrate 1a or may be smaller in thickness than the channel substrate 1a.

It is preferable that the microchannels 5 formed on the surface of the channel substrate 1a are approximately 0.1 μm to 100 μm in depth and width. However, this is not intended to limit the present invention. Further, the microchannels 5 are approximately 1 mm to 10 mm in length. However, the length of the microchannels 5 can be changed as appropriate depending on the size of the channel substrate 1a.

The flow channel of the microchannels 5 may be of a prism shape or a cylindrical shape that conforms to the flow direction of a fluid. That is, the microchannels 5 can be rectangular, trapezoidal, or circular (semicircular) in cross section perpendicular to the flow direction of a fluid.

The microchannel 5 can be fabricated by, for example, forming a raised portion and a depressed portion on the channel substrate 1a. For example, the microchannel 5 may be defined by a depressed portion formed on the channel substrate 1a or by a region surrounded by a plurality of raised portions which are formed on the channel substrate 1a. Alternatively, the microchannel 5 may be defined by a combination of the raised portion and the depressed portion both of which are formed on the channel substrate 1a. It would be easy for a person skilled in the art to fabricate a microchannel having a desired shape by using any of various kinds of publicly known techniques. During the fabrication of the microchannels, the check valves can be formed in the same manner, if necessary.

As in the case of the microchannel 5, the inlet section 6 and the outlet section 7 may be formed by any of various kinds of publicly known techniques. The sizes of these members can be changed as appropriate depending on the size and shape of the microchannels 5.

As described above, the microchip of the present invention is configured to include: a microactuator (fluid-controlling device) which will be detailed later; and a channel substrate having a microchannel (microflow channel) formed thereon, the microactuator having an opening which is joined to the microchannel, the microactuator having a hollow part which is communicated with the microchannel. In a more preferable arrangement of the microchip of the present invention, the channel substrate has first and second microflow channels formed on a substrate thereof and communicated with each other via the microactuator.

[2. Microactuator]

As described previously, a region constructed by the hollow part of the glass substrate 1b and the glass sheet 2 in the microchip 100 is a microactuator for defining the flow direction of a fluid in the microchip 100 and controlling a flow of the fluid. The microactuator can function as means for vibrating a fluid filled in the microchannels 5 or as driving means for promoting/suppressing the movement of the fluid filled in the microchannel 5 from the inlet section 6 to the outlet section 7.

As illustrated in FIG. 1, the microactuator of the present invention may be arranged so as to be detachable from the overall structure of the microchip 100 or may be integrated, as a part of the microchip 100, with the microchip 100. The hollow part of the microactuator of the present invention may be arranged, as illustrated in FIG. 1, to serve as a through hole of the glass substrate 1b or may be arranged such that a recessed part provided in the glass substrate 1b has the first opening 3' formed on the side of the top surface of the glass substrate 1b and that ports (the second opening 4) are formed to extend downward from the bottom end of the recessed part to the bottom surface of the glass substrate 1b. Since the first opening 3' of the glass substrate 1b is sealed by the glass sheet at the construction of the microactuator, it can be said that the second opening 4 (ports 4a and 4b) of the glass substrate 1b is an opening of the miroactuator.

FIG. 2 shows an example of a microactuator which is arranged so as to be detachable from the overall structure of the microchip 100. A microactuator 10 illustrated in FIG. 2 is arranged such that ports are formed on a bottom of the recessed part of the glass substrate 1b.

(a) of FIG. 2 shows the microactuator 10 constructed by (i) a part of the glass substrate 1b, which is located under the glass sheet 2, and (ii) the glass sheet 2. In the microactuator 10 shown in (a) of FIG. 2, the glass sheet 2 changes the volume of the hollow part 3 by displacing according to a pressing force applied toward the hollow part 3. This causes entry and exit of a fluid through the ports 4a and 4b. As shown in (b) of FIG. 2, when the port 4a is sealed by the glass sheet 2 being displaced, the entry and exit of the fluid through the ports 4a and 4b are stopped. It should be noted that one or all of the ports may be sealed by the glass sheet 2 ((c) and (d) of FIG. 2).

Glass will not sag by its own weight and will not be naturally adsorbed to the glass substrate. This allows the microactuator 10 to attain an extremely small dead volume (i.e. the volume of the hollow part). Consequently, when used as a valve, the microactuator 10 can avoid mixture of fluids and generation of a fluid flow in the inverse direction. The microactuator 10 can be designed such that a distance between the glass sheet 2 and the second opening 4 falls within the range from 1 μm to 100 μm. In a case where the microactuator 10 is used for cell separation which will be described later, the distance between the glass sheet 2 and the second opening 4 is preferably 10 μm to 50 μm. Further, the diameter of the first opening 3' to be sealed by the glass sheet 2 may be designed according to a distance between the first opening 3' and the second opening 4 (distance between the glass sheet 2 and the second opening 4). However, the diameter of the first opening 3' is preferably not larger than 5 mm, more preferably 1 mm to 3 mm.

As shown in Examples below, the configuration illustrated in (a) of FIG. 1 provides a maximum curvature of approximately 30 mm when application of stress to a spot in the vicinity of the center of the glass substrate 2 sealing the hollow part of 4 mm in diameter displaces the spot in the vicinity of the center of the glass substrate 2 by approximately 100 μm, which is a necessary and sufficient displacement from a practical perspective. Even when a stress is vertically applied to glass, glass will not break (will keep stable) under the condition where a tensile stress is not higher than 50 MPa. Given that, it was found that it is necessary to use a glass sheet having a thickness of not larger than 50 μm in order to stably obtain the displacement in amount of 100 μm. That is, when the thickness of the glass sheet is not larger than 50 μm, the glass sheet can seal the second opening 4 (ports 4a and 4b) which is spaced at a distance of about 100 μm from the first opening 3'. In terms of stability of the device and material fatigue of the glass sheet, the glass sheet 2 is preferably not larger than 25 μm in thickness. Note that although the glass sheet 2 is suitably thinner, a realistic thickness of the glass sheet 2 is equal to or larger than 1 μm in consideration of the technological level of production of the glass sheet 2. Thus, the glass sheet of not larger than 50 μm in thickness can stably operate with no breaks caused even when the glass sheet is displaced in amount of about 100 μm. The thickness of the glass sheet 2 for sealing the ports 4a and 4b by mean of displacement of the glass sheet 2 is 1 μm to 50 μm, preferably 1 μm to 25 μm, more preferably 4 μm to 25 μm. A glass sheet having such a thickness may be fabricated by a publicly known method, preferably by an overflow method or a float method.

FIG. 3 shows an example of a microactuator which is arranged so as to be integrated, as a part of the microchip 100, with the microchip 100. FIG. 3 is a top view and a cross-sectional view of the microchip 100 in accordance with the embodiment of the present invention. The microchip 100 in accordance with the present embodiment also includes (i) the channel substrate 1a and (ii) a combination of the glass 1b and the glass sheet 2, wherein (i) and (ii) are opposed to each other, and the microchip 100 is formed by laminating (i) the channel substrate la and (ii) the combination of the glass 1b and the glass sheet 2. Note that the glass sheet 2 is omitted in the top view of FIG. 3.

The channel substrate la has the inlet section 6 and the outlet section 7 which are jointed to the microchannels 5a and 5b, respectively, formed on the surface of the channel substrate 1a. The glass substrate 1b has the hollow part 3, wherein the first opening 3' formed on the side of the top surface of the glass substrate 1b is sealed by the glass sheet 2, and two ports 4a and 4b serving as the second opening 4 are provided immediately below the hollow part 3 so as to be formed on the bottom surface side of the glass substrate 1b. The ports 4a and 4b of the glass substrate 1b are joined to the microchannels 5a and 5b, respectively. With this arrangement, the hollow part 3 is communicated with the inlet section 6 and the outlet section 7 via the microchannels 5a and 5b, respectively. While the hollow part 3 is communicated with only the inlet section 6 and the outlet section 7, the hollow part 3 is separated from the outside of the microchip 100.

As in the case of the microchannels, the ports 4a and 4b, the inlet section 6, and the outlet section 7 may be formed by any of various kinds of publicly known techniques. The sizes of these members can be changed as appropriate depending on the size and shape of the microchannels 5.

In FIG. 3, the microactuator 10 may be referred to as (a) an entire area constituted by the whole glass substrate 1b and the glass sheet 2 or may be referred to as (b) an area constituted by (i) the glass sheet 2 and (ii) a part of the glass substrate 1b which part is located immediately below the glass sheet 2 (i.e. the configuration shown in (a) of FIG. 2). If necessary, the microactuator 10 may further include a part of the channel substrate 1a which part is located immediately below the glass sheet 2. The hollow part 3 may be a tapered through hole extending from the first opening 3' to the second opening 4. The number of ports (second opening) can be changed as appropriate depending on the number of microflow channels to be joined thereto.

The microactuator 10 arranged as above can have at least one of a structure of defining the flow direction of a fluid filled in the microchannels 5 joined to the ports, a structure of physically stopping the flow of a fluid filled in the microchannels 5, a structure of cutting a fluid filled in the microchannels 5, a structure of separating a fluid filled in the microchannels 5, and the like structure. If necessary, the microactuator 10 may have all of these structures.

With a recent advance of a glass processing technique, there has been established a method of stretch-molding glass to produce a sheet of glass further thinner than a common cover glass or the like glass (approximately 200 μm in thickness). Examples of such method include an overflow method and a float method. The overflow method is a plate-making method by which molten glass is poured into a wedge-shaped mold having a hollow inside, the molten glass is spilled out from both sides of the mold so that overflows run down the surfaces of the wedge-shaped mold are fused into one at the lower edge of the wedge-shaped mold. By the overflow method, a piece of sheet glass having 5 μm in thickness at minimum has been recently realized. Further, the float method is a plate-making method by which molten glass is poured onto molten metal, and the glass is then cooled while being pulled off. The float method can produce glass having properties which are much the same as those of glass produced by the overflow method. These pieces of sheet glass are not only very thin. But also, they are very smooth because they do not undergo a surface-scratching process (i.e. polishing). They are of a high flatness in nano level. For example, Japanese Patent Application Publication No. 2012-087006 (published on May 10, 2012) discloses a method for producing a glass film, which is used in a dielectric member for a capacitor, a substrate for a flat panel display, and others, by heating a glass preform of not smaller than 50 mm in width and of smaller than 0.2 mm in thickness in a heating furnace and draw-molding a molten glass preform into a glass film of 1 to 300 mm in width and of 1 to 50 μm in thickness.

Japanese Patent Application Publication No. Tokukai 2012-087006 describes that processing glass into a sheet form allows glass to have flexibility and that the smaller the thickness of glass is, the higher the flexibility of glass is. However, Japanese Patent Application Publication No. Tokukai 2012-087006 recognizes that the advantages of the processing of glass into a sheet form are merely (i) enhancement in portability of the glass by folding or winding the glass and (ii) the feasibility of the glass that is usable not only on a flat surface but also on a curved surface. That is, the flexibility required for the sheet glass is to such an extent that the sheet glass can be folded, wound up, and used in conformity to a curved surface, with no fear of breaking, and it has not been previously recognized that such a sheet glass would be usable as a member constituting a fluid-controlling device for microchip. It should be noted that, as a matter of course, (a) the intended purposes like folding, winding, and using in conformity to a curved surface and (b) the intended uses as a dielectric member for a capacitor and as a substrate for a flat panel display are not relevant to a fluid-controlling device for microchip.

Further, it is very difficult to anticipate, from the intended purposes like folding, winding, and using in conformity to a curved surface, the durability of the glass sheet, which durability is sufficient for use in the fluid-controlling device for microchip, to such an extent that the sheet glass does not suffer from breakage or leakage caused by material fatigue even after local pressure is repeatedly applied to the sheet glass at a high speed.

The microvalve mechanism disclosed in Japanese Patent Application Publication No. Tokukai 2005-308200 deforms, under pressure of a pressing member 19, a fluid element chip 12 having microflow channels and a circular hollow part 13 formed thereon. On the contrary, a fluid-controlling device of the present invention is arranged such that neither the microflow channels nor the hollow part is not provided in the glass sheet to be deformed; therefore, the fluid-controlling device of the present invention is not achieved by mere replacement of the PDMS of the microvalve mechanism disclosed in Japanese Patent Application Publication No. Tokukai 2005-308200 with glass. Furthermore, the fluid-controlling device of the present invention is arranged such that microflow channels are provided in the glass substrate which is located at a position opposite to the glass sheet. This makes it possible to design the diameter of the microflow channel independently from the thickness of the glass sheet and to design the thickness of the glass sheet, independently from the diameter of microflow channel, to any value.

[3. Application Examples]

Figure 4:
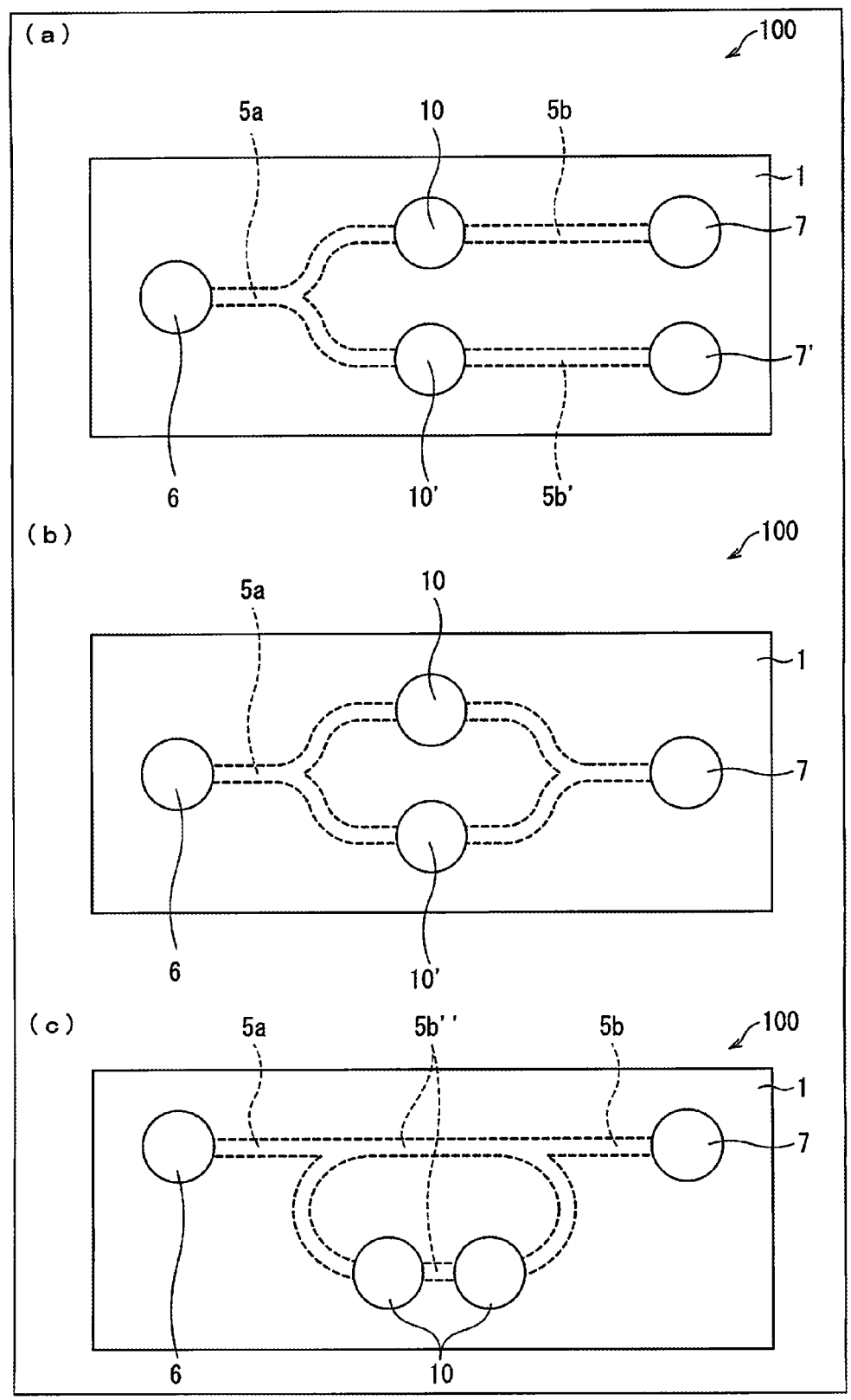
FIG. 4

The microchip 100 of the present invention may be arranged such that a microflow channel 5a may be configured to have (i) a single flow channel and (ii) microflow channels which are branched off from the single flow channel and are coupled to a plurality of microactuators (microactuators 10 and 10'), respectively ((a) of FIG. 4). Microflow channels 5b both of which are coupled to the plurality of fluid-controlling devices may join into one ((b) of FIG. 4). With the arrangement as shown in (b) of FIG. 4, a fluid flow in the microchip 100 can be changed by closing one of the microactuators and then opening the other microactuator. Alternatively, the microchip 100 may be arranged to be provided with an on-chip pump in which a plurality of microactuators are operated simultaneously with each other, so that movement of a fluid from the inlet section 6 to the outlet section 7 can be promoted/suppressed ((c) of FIG. 4). In this arrangement, the microchip 100 does not need to be provided with a check valve for defining a flow direction of the fluid. In addition, the use of the microchips 100 arranged as illustrated in (a) through (c) of FIG. 4 realizes continuous or intermittent movement of a sample from the inlet section 6 to the outlet section 7 in the microchannel 5. In the microflow channels 5b, 5b', and 5b", respective analysis sections may be provided to bind target substances (subject substances) contained in a sample to each other and analyze the target substances.

The term "sample" as used herein refers to a specimen (object to be detected) applied to the inlet section of the microchip, and the sample does not necessarily contain a subject substance that is a subject to detection. Examples of the subject substance may include, but are not limited to, a protein (e.g. an antigen, an antibody, an enzyme, and a peptide), DNA, a sugar, and a synthetic polymer. In a case where the sample is blood, the subject substances can be any of blood components such as immunoglobulin, albumin, GOT, GTP, γ-GPT, HDL, LDL, neutral fat, uric acid, and glucose.

The movement of the sample from the inlet section 6 to the outlet section 7 in the microchannel 5 may be carried out continuously or intermittently. Detection of the subject substance by the analysis section may be made by a conventionally known method. For example, assuming that an optical detection of the subject substance is made, ultraviolet-visible spectroscopic analysis, fluorescence analysis, chemiluminescence analysis or the like method is suitably used.

Recently, there has grown the need for handling cells individually rather than collectively in the field of cellular biology. For example, injection of ES cell into which a gene has been introduced into an egg cell for generation of an individual organism was previously achieved by injecting the cells in cluster into an egg cell. Such a method unfavorably generated an individual organism, called "chimeric mouse", in which a modified body and a non-modified body are mixed. In addition, such a method enables obtaining of an intended individual organism after production of one to two generations. This process requires several months to nearly one year and is therefore, a time-consuming process. By handling cells individually rather than collectively, it is possible to directly inject an ES cell into which a gene has been introduced in an egg cell, thus allowing for preparation of a desired individual organism in only one generation.

With use of the present invention, it is possible to integrate all of the following manipulations: separation of cells into the respective flow channels on an one-by-one basis; bonding (patterning) and culturing of the cells at respectively predetermined positions of the flow channels; and stimulation, genetic manipulation and/or genetic analysis with respect to the cells on an one-by-one basis; and solid-liquid separation for final collection of each of the cells on an one-by-one basis.

Figure 5:
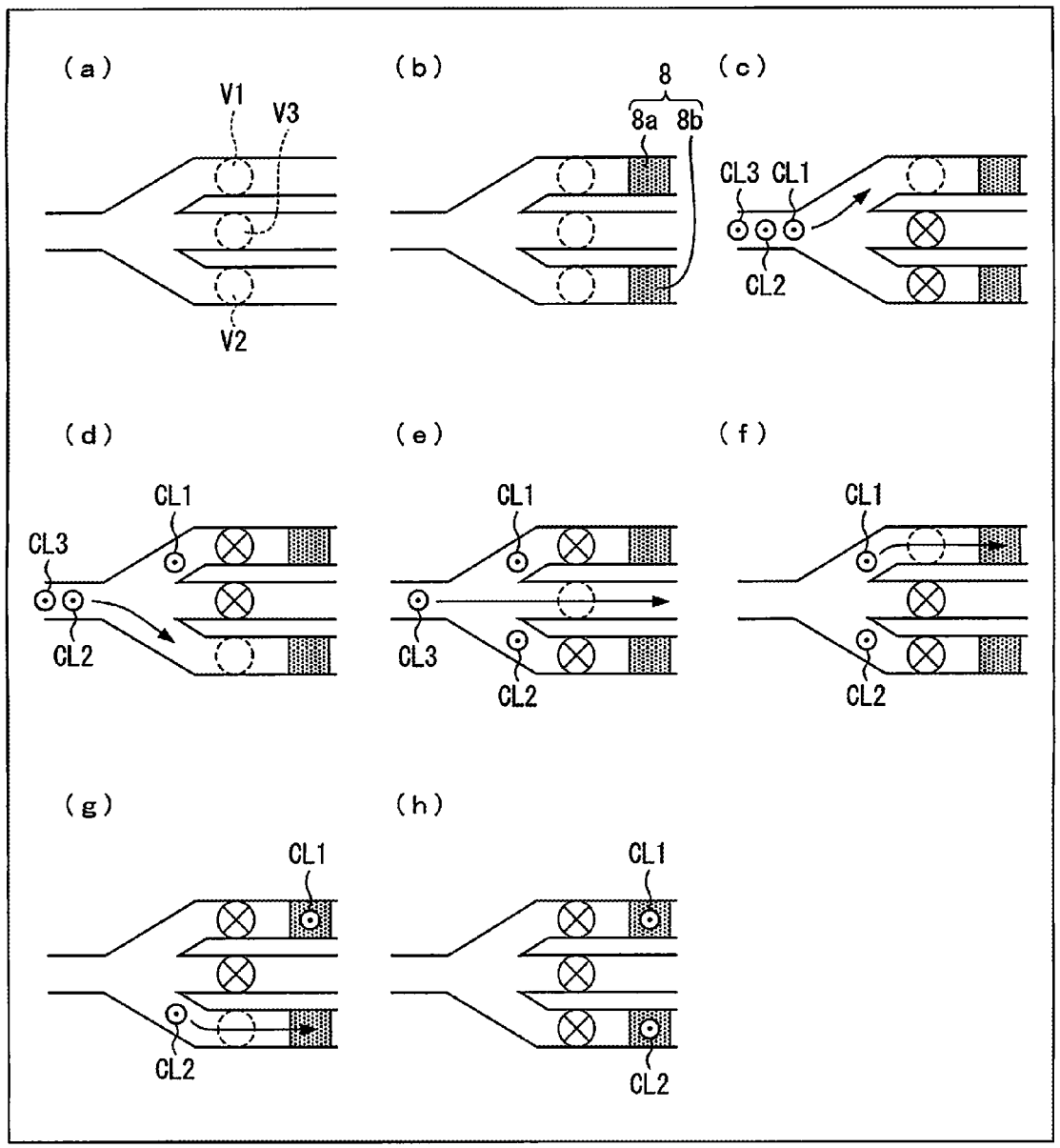
FIG. 5

FIG. 5 shows an example system for using a valve to separate and culture a single cell in a flow channel. (a) of FIG. 5 shows a design of a flow channel, wherein respective valves are provided in three branch channels from which one flow channel is branched. (b) of FIG. 5 illustrates the state of cell adhesion areas having been subjected to surface patterning.

Cells CL1 to CL3 are introduced into the system. Subsequently, the valve of the branch channel located at the top of the drawing is opened while the valves of the other branch channels are closed, so that the cell CL1 alone is introduced to an intended branch channel ((c) of FIG. 5). Thereafter, the valve of the branch channel to which the single cell CL1 has been introduced in (c) of FIG. 5 is closed, and the valve of the branch channel located at the bottom of the drawing is then opened. This allows the cell CL2 to be introduced to an intended branch channel ((d) of FIG. 5). Thereafter, the valve of the branch channel to which the single cell CL2 has been delivered in (d) of FIG. 5 is closed, and the valve of the branch channel located at the center of the drawing is then opened. This allows the remaining cell CL3 to be introduced to an intended branch channel and then removed from the system ((e) of FIG. 5). Thereafter, the valve of the branch channel located at the top of the drawing is opened, while the valves of the other branch channels are closed. This allows the cell CL1 to be moved to the corresponding cell adhesion area ((f) of FIG. 5). The valve of the branch channel to which the single cell CL1 has been introduced is closed, and the valve of the branch channel located at the bottom of the drawing is then opened. This allows the cell CL2 to be moved to the corresponding cell adhesion area ((g) of FIG. 5). Subsequently, the flows in all of the branch channels are stopped by closing all of the valves, so that the cells are adhered to the cell adhesion areas ((h) of FIG. 5). Then, perfusion culture of the cells thus adhered is started.

For patterning, a publicly known patterning method (K. Jang et al., Lab on a Chip 10(15): 1937-1945 (2010)) is suitably used in which a single cell supplied to a flow channel in a glass microchip is subjected to patterning with use of light. However, with the microchip having a PDMS valve, it is impossible to carry out patterning that requires for the use of an organic solvent. As a matter of course, without the use of the present invention, it is impossible to construct valves for delivering cells to the separate flow channels so that the cells are separated from each other.

As described above, the microchip in accordance with the present invention allows all of the flow channels and valves to be fabricated from glass. This makes it possible to find applications in an extremely wide range and to contribute to the provision of a versatile system.

In addition, the microchip in accordance with the present invention may be arranged such that the microchip 100 is provided with a pump(s) (on-chip pump) therein, as illustrated in (c) of FIG. 4. Employment of such an arrangement allows fluid-contacting surfaces of the flow channels and pumps to be made of glass.

Examples of the pump used in a microchip include a pump provided in a PDMS microchip, as exemplified by a pneumatic drive-type pump (M. A. Unger et al., Science 288 (7): 113-116 (2000)) and a piezo drive-type pump (W. Gu et al., Proc. Natl. Acad. Sci. USA 101 (45): 15861-15866 (2004)). As described previously, PDMS is an elastic material that can be easily processed; it can be said that PDMS is suitable as a material for the on-chip pump. Recently, there have been conceived on-chip pumps with performances improved in terms of the degree of integration and portability. For example, a pump equipped with a check valve (Japanese Patent Application Publication No. 2005-283331 (published on Oct. 13, 2005)) and a peristaltic pump (Japanese Patent Application Publication No. 2005-337415 (published on Dec. 8, 2005)) have been known. However, a microchip using a PDMS, plastic, or the like material even in a part of the fluid-contacting surfaces loses its chemical stability, thus resulting in limited applications of the microchip. Besides, a pump using parylene or teflon®, each of which is a comparatively stable material, has been known. Such a pump is, however, inferior to a pump made of glass in gas permeability and chemical durability.

As an on-chip pump for realizing a microchip including fluid-contacting surfaces which are made entirely of glass, (i) a pump using a mechanical driving force, wherein a structural object in a flow channel is caused to rotate with use of light and then delivered, by shear stress, with a liquid flowing through the flow channel (Japanese Patent Application Publication No. 2008-196481 (published on Aug. 27, 2008)) and (ii) a pump using osmotic pressure, wherein a difference in pressure between solvents is utilized (Japanese Patent Application Publication No. 2009-115755 (published on May 28, 2009)) can be considered as usable. In addition, as an in-chip driving mechanism without use of a driving mechanism, a solution delivery method using (a) an oil-water two-phase flow formed in a microflow channel and (b) shear stress caused between solvents (Y. Kikutani et al., Microchim Acta 164: 241-247 (2009)) can be considered as usable. However, the pump described in Japanese Patent Application Publication No. 2008-196481 (published on Aug. 27, 2008) uses photopolymerization resin for the driving mechanism itself. The pump described in Japanese Patent Application Publication No. 2009-115755 uses a semi-translucent film. These pumps are inferior in chemical stability. In addition, the technique described in Y. Kikutani et al., Microchim Acta 164: 241-247 (2009), which requires a solution delivery from outside, cannot be used for an on-chip pump. Besides, the method for coating the inside of a PDMS chip with glass (A. R. Abate et al., Lab Chip 8: 516-518 (2008)) is superior in chemical stability, but is weak with respect to mechanical driving. As a result, such a method causes a loss in bendability, which is a feature of PDMS.

The on-chip pump being usable under a high pressure, being usable with an organic solvent, and being usable for a versatile microchip system is unknown heretofore.

Figure 9:
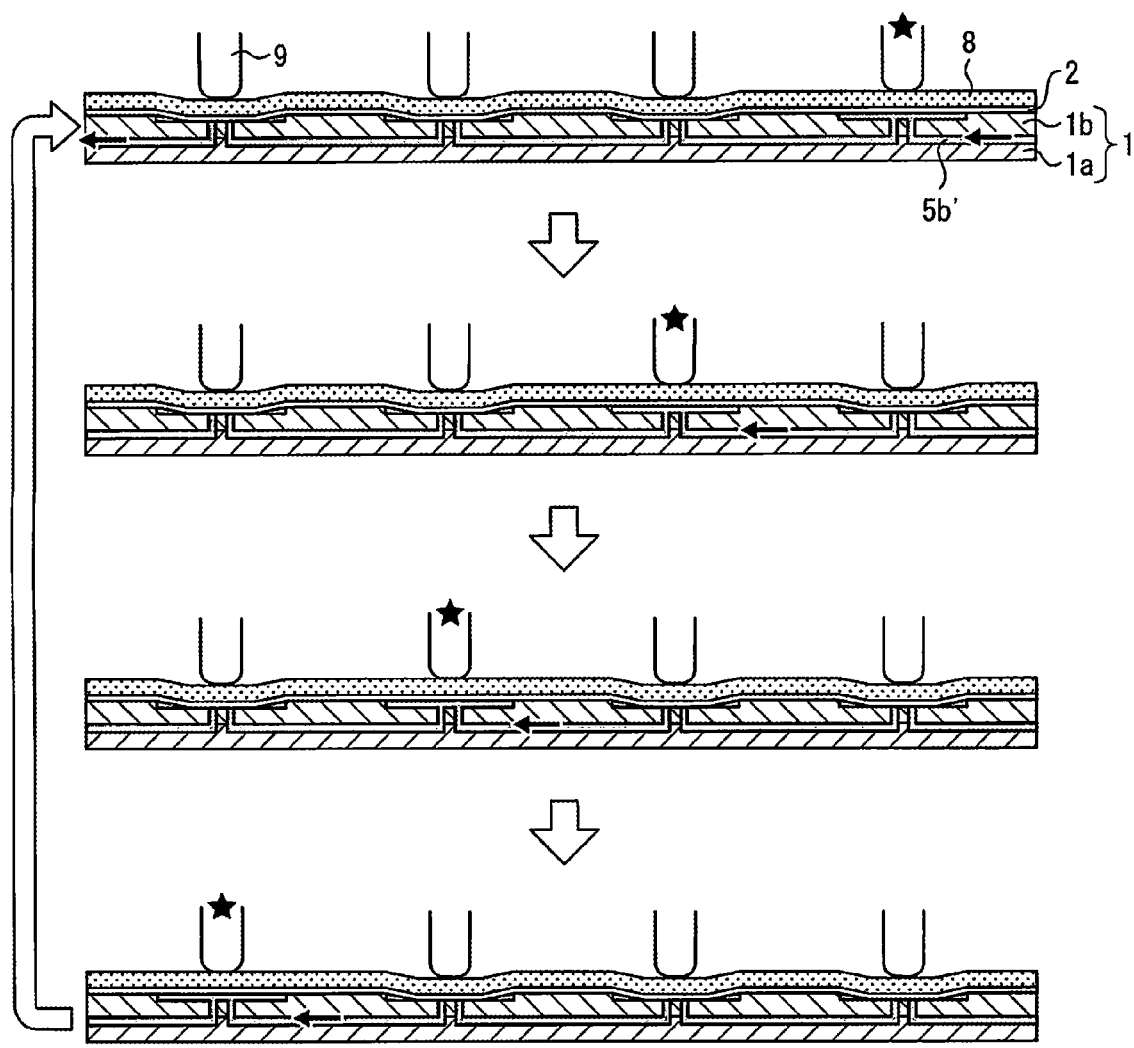
FIG. 9

FIG. 9 shows a driving principle of an on-chip pump. In FIG. 9, a single microchannel 5", which is formed in a single substrate 1 constituted by a single channel substrate 1a and a single glass substrate 1b, has a plurality of microactuators 10 (four microactuators in FIG. 9) provided in series. A plurality of first openings 3' are sealed by a single glass sheet 2. Pressing sections 9 are provided at the positions respectively corresponding to the microactuators 10. When a microactuator 10 being opened is pressed by the corresponding pressing section 9, the microactuator 10 is closed. When a microactuator 10 is released from pressing of the corresponding pressing section 9, the microactuator 10 is opened.

All of the pressing sections 9 are controlled in a ganged manner so that a timing of release (marked with a star) of the pressing sections 9 is shifted in one direction in such a manner that they take their turns to open at periodic intervals. As a result, a fluid can be delivered in the above-described direction, similarly to the peristaltic pump (Japanese Patent Application Publication No. 2005-337415).

Although a small dead volume is preferable for the valve function, a large amount of displacement of a glass sheet is preferable for the pump function. Therefore, in order to construct an on-chip pump requiring displacement in amount of not smaller than 50 μm, the thickness of a glass sheet is preferably not larger than 10 μm.

Note that an on-chip pump constituted by a plurality of microactuators directly coupled to each other loses its pump function if any of the microactuators becomes damaged. Further, in order that the microactuators are used as the on-chip pump, the microactuators need to be durable even if continuously operated at a high speed. In view of these points, in the arrangement shown in FIG. 9, a protective film composed of PDMS is provided to serve as a protective film 8 for avoiding the possibility of breakage of the microactuators. Although not being entirely made of glass, the microchip 100 provided with the protective section 8 is arranged such that the region defining a flow channel is entirely made of glass and is therefore free from the disadvantages of the microchip made of non-glass material.

The present invention is not limited to the aforementioned embodiments and is susceptible of various changes within the scope of the accompanying claims. Also, an embodiment obtained by suitable combinations of technical means disclosed in the different embodiments is also included within the technical scope of the present invention.

EXAMPLES

Example 1

Mounting of Glass Sheet over Chamber and Confirmation of Manual Driving

An instrument was prepared by perforating a PDMS1c of 2 mm in thickness with a hole of 4 mm in diameter and then attaching a glass sheet 2 of 6 μm in thickness onto the PDMS1c so that the hole was covered by the glass sheet 2 ((a) of FIG. 1). A PDMS block was placed on one surface of the glass sheet 2. Then, the PDMS block was pressed down with tweezers, and the displacement of the glass sheet 2 by the press with the tweezers was observed under a microscope. From the result of the observation, it was shown that the glass sheet 2 was sagged in response to the pressing force applied thereto, and the amount of displacement made by such a sag was approximately 110 μm at maximum, which amount is large enough to generate and stop a fluid flow in a microflow channel. Also, it was shown that no breaks or leaks occur on the glass sheet 2 under repeated presses. This verified that the instrument has durability required to function as a fluid-controlling device used for a microflow channel.

Example 2

Confirmations of (i) Driving of Glass Sheet in Piezo Fluid-Controlling Device and (ii) Driving of Fluid A simple microchip was prepared by fitting the instrument illustrated in (a) of FIG. 1 into a glass substrate 1a having microflow channels 5a and 5b formed on the bottom thereof ((b) of FIG. 1). The microchip shown in (b) of FIG. 1 is arranged such that a hollow part, which has an opening sealed by a glass sheet, communicates with an inlet section 6 and a outlet section 7 via the microflow channels 5a and 5b ((c) of FIG. 1).

Into the microflow channels 5a and 5b and the hole of the instrument, a fluid L containing polystyrene microparticles was charged. It was examined whether the fluid filled in the microflow channel 5b could be driven by a pressing force of 200 mN mechanically applied to the glass sheet 2 of the instrument by a piezo fluid-controlling device 9. The polystyrene microparticles contained in the fluid and existing in the microflow channel 5b were subjected to video observation under a microscope.

As a result, it was observed that the fluid moved in response to the motion of the piezo fluid-controlling device 9. This indicates that the glass sheet 2 can sufficiently withstand a force of 200 mN and that the glass sheet 2 generates a force sufficiently large enough to drive the fluid L. Thus, the arrangement of the fluid-controlling device of the present invention exerts a sufficient fluid driving performance required for its use as a fluid-driving device like a valve or a pump.

Example 3

Mounting of Glass Sheet over Chamber and Confirmation (1) of Valve Function

In Examples 1 and 2, it was shown that the fluid-controlling device of the present invention has a sufficient flexural property in a microscopic region and a sufficient fluid-driving performance. In this Example, it was then verified that the fluid-controlling device of the present invention functions as a valve.

Figure 6:
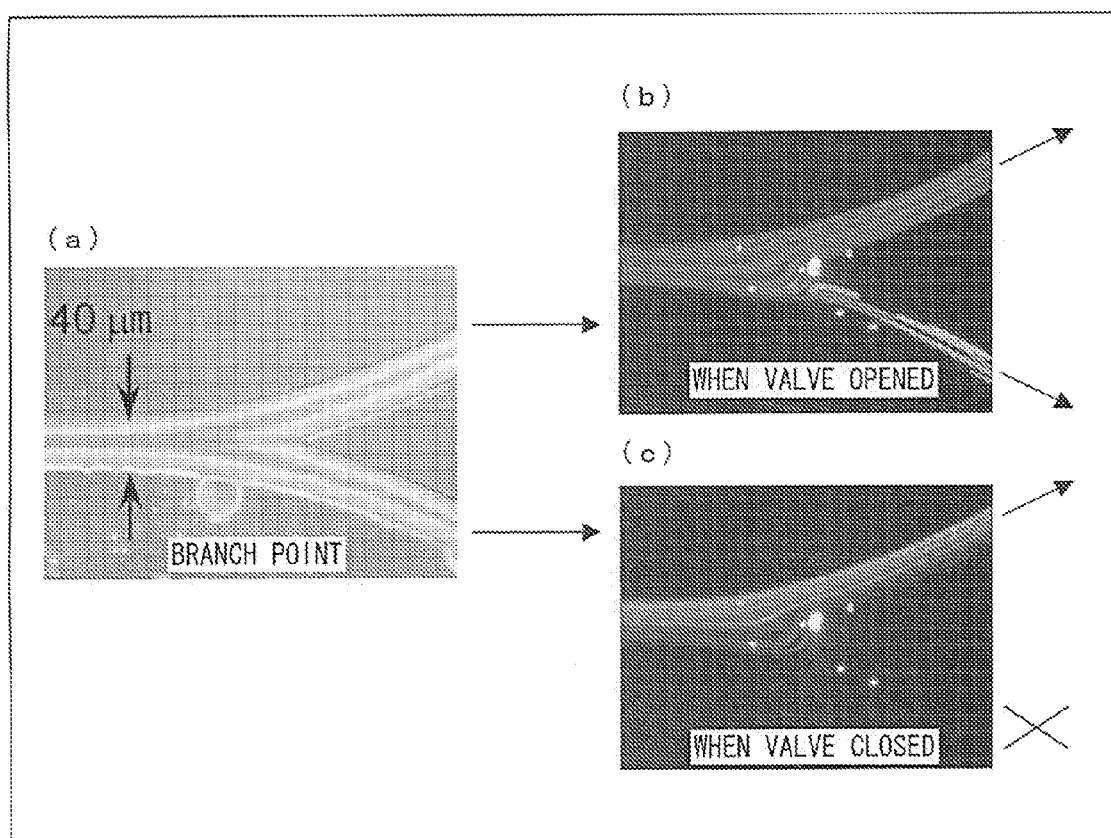
FIG. 6

As illustrated in FIG. 6, a branch-type (Y-shaped) flow channel of 40 μm in width and 20 μm in depth was designed on an alkali-free glass substrate, and a valve structure, of 20 μm in height and 3 mm in diameter, using a glass sheet of 5 μm in thickness was then embedded into each branch channel of the flow channel. Over the valve structure, a piezo fluid-controlling device for Braille use was mounted so that opening and closing of the valve structure can be manually controlled.

Into the flow channel of FIG. 6, a solution for visualization which solution contains fluorescent beads of 2 μm in diameter is charged at a rate of 1 μL per min from a left-hand side of the drawing in FIG. 6 with use of a syringe pump, and only the valve provided in a lower branch channel was opened and closed. In this manner, it was examined whether switching between movement of the fluid toward both of the branch channels (when the lower valve was opened) and movement of the fluid toward only one of the branch channels (when the lower valve was closed) was possible.

As a result, it was confirmed that the flow of the fluid was switched by the opening and closing of the valve, as shown in FIG. 6. In addition, a time required for the switching was within one second. This proved that the fluid-controlling device of the present invention is available for use as a switching valve and is adequately applicable to high-speed cell separation and the like.

Example 4

Mounting of Glass Sheet over Chamber and Confirmation (2) of Valve Function

Next, as to the above-described Y-shaped, branch-type flow channel, one of the branch flow channels was thoroughly blocked, at a downstream end (indicated by reference numeral 7' in (a) of FIG. 4), by a threaded cap. Specifically, a flow channel A having an opened downstream end and a flow channel B (indicated by reference numeral 5' in (a) of FIG. 4) having a closed downstream end were formed, so that a substantially single flow channel was formed. A solution for visualization which solution contains fluorescent beads of 2 μm in diameter was charged at a constant pressure of 0.1 kPa from upstream of the microchip, and the valve of the flow channel A was opened and closed. The amount of displacement of the fluorescent beads was measured on the basis of a moving image taken for the flow channel A (vicinities of the member indicated by reference numeral 10 on the microflow channel 5a in (a) of FIG. 4). On the basis of the result of the measurement in displacement, the behavior of the fluid was determined.

Figure 7:
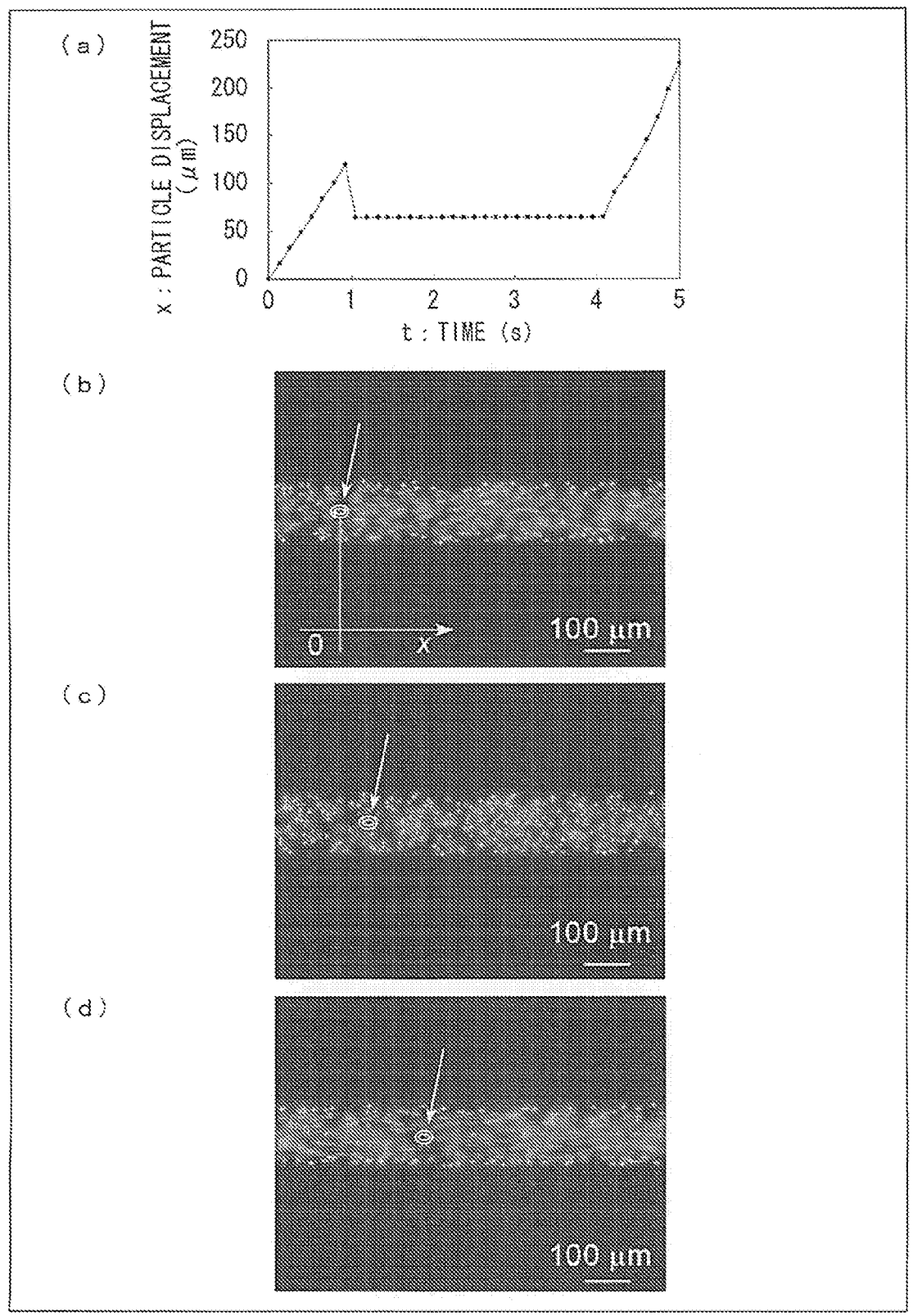
FIG. 7

As shown in (a) of FIG. 7, it was observed that the fluorescent beads in the flow channel A moved in the right-hand direction of FIG. 7 for the duration of time until the valve being opened was closed, and it was confirmed that when the valve was closed, a slight backflow occurred, and movement of the fluorescent beads in the flow channel A was then completely stopped, and when the valve was opened again, the fluorescent beads in the flow channel A were moved in the right-hand direction of FIG. 7. (b) through (d) of FIG. 7 shows the result of fluorescence microscopy observation of the movement of the fluorescent beads located upstream of the valve in the flow channel A at the respective points in time, i.e. t=0 second, 1.05 seconds, and 4.21 seconds, after the valve was opened. FIG. 7 assumes that the left-hand side of FIG. 7 is an upstream side, the right-hand side of FIG. 7 is a downstream side, and the displacement of the particles is represented by x (the displacement caused by movement toward the right-hand direction of FIG. 7 is indicated by a positive value.). In the experiment conducted in the present Example, pressure was available in the range from 0.1 kPa to 3.0 kPa, and a response speed of the valve was approximately 0.1 second. Further, it was demonstrated that the valve is good for repeated operations.

Example 5

Mounting of Glass Sheet over Chamber and Confirmation (3) of Valve Function

Further, into the above-described Y-shaped, branch-type flow channel (with both of the branch channels open), a solution for visualization which solution contains fluorescent beads of 2 μm in diameter was charged from upstream of the microchip at a constant pressure of 3.0 kPa, and while a selected one (indicated by reference numeral 10' in (a) of FIG. 4) of the valves is maintained open all the time, the other valve (indicated by reference numeral 10 in (a) of FIG. 4) was opened and closed. From a moving image taken for the vicinities of a branch point, the behavior of the fluid was determined.

Figure 8:
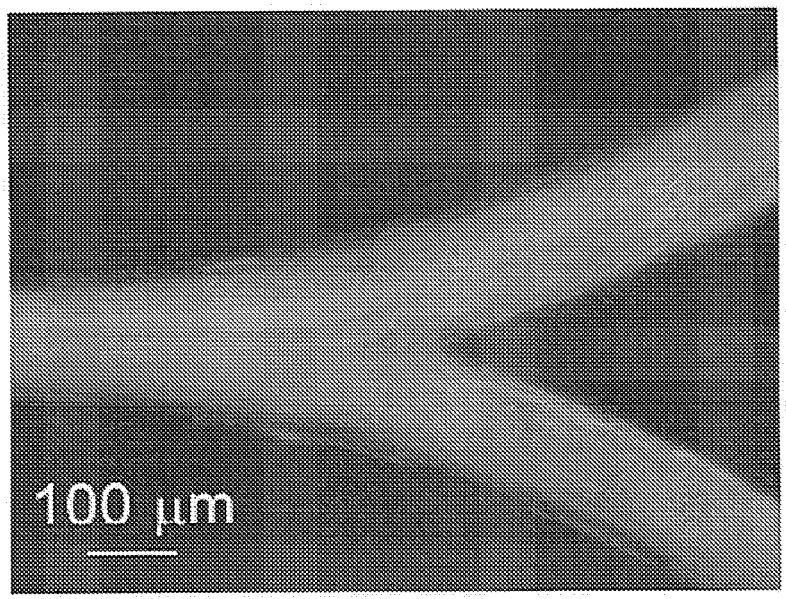
FIG. 8
Figure 8:
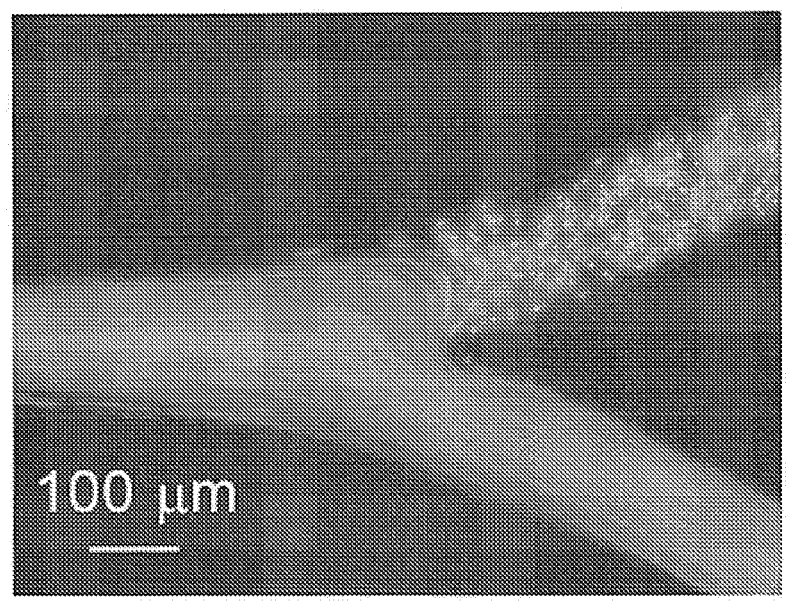

The following behavior of the fluid was observed. As shown in (a) of FIG. 8, the fluid was being flown through two branch channels while both of the valves were being opened. When the valve of the branch channel (upper branch channel) located on the upper side of (b) FIG. 8, the flow of the fluid toward the upper branch channel was completely blocked so that the fluid was flown through the lower branch channel alone, as shown in (b) of FIG. 8. Then, when the valve of the upper branch channel was opened again, the fluid was flown through both of these two branch channels. This demonstrated the switching of the valve. In the experiment conducted in the present Example, a response speed of the valve was approximately 0.1 second. Further, it was demonstrated that the valve is good for repeated operations.

Example 6

Mounting of Glass Sheet over Chamber and Confirmation of Pump Function

With use of the arrangement shown in (c) of FIG. 4 and the arrangement shown in FIG. 9, a microchip with (i) a single flow channel extending from an inlet section 6 to an outlet section 7 and (ii) a bypass flow channel (circular flow channel) branched from the single flow channel and then merged with the single flow channel was prepared. As shown in (a) of FIG. 4, a first microflow channel 5a extending from the inlet section 6 and a second microflow channel 5b extending from the outlet section 7 are connected to a circular flow channel 5b". A microactuator has a hollow part of 3 mm in diameter and 50 μm in depth and also has ports 4a and 4b of 300 μm in diameter spaced at 500 μm. To the microactuator, a glass sheet of 6 μm in thickness and a PDMS protection sheet of 200 μm in thickness are attached.

Figure 10:
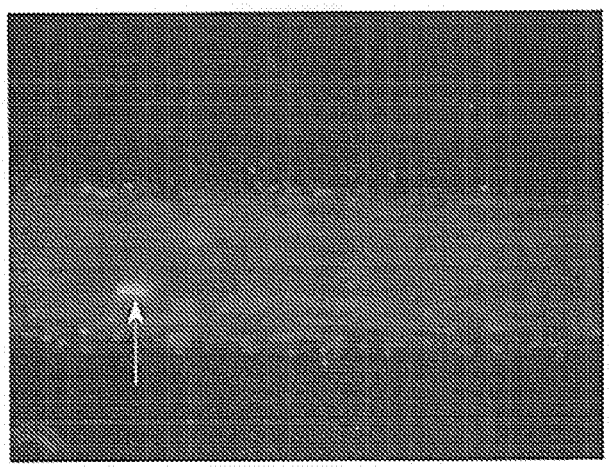
FIG. 10
Figure 10:
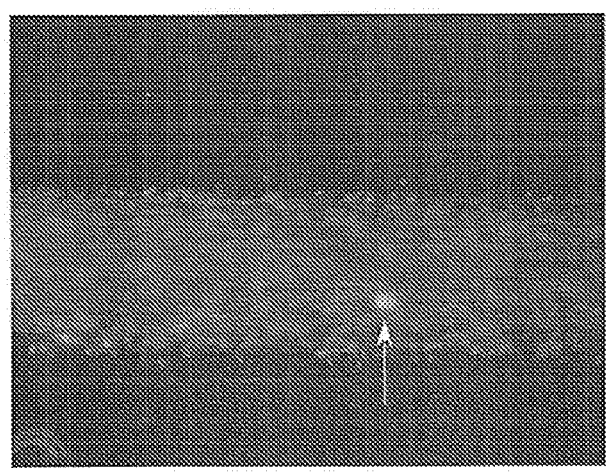
Figure 10:
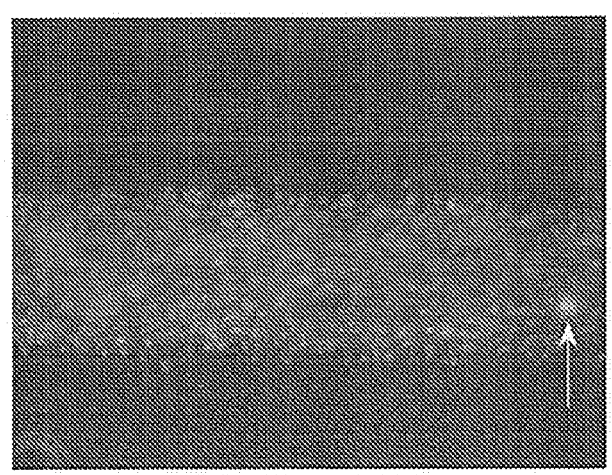
Figure 11:
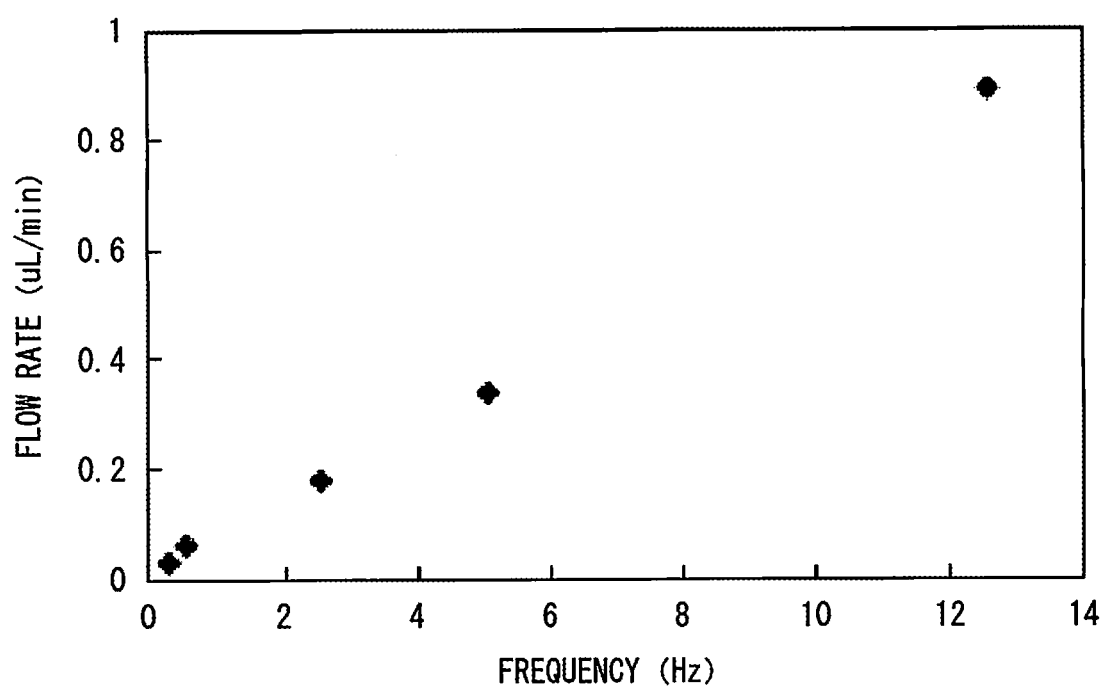
FIG. 11
Figure 12:
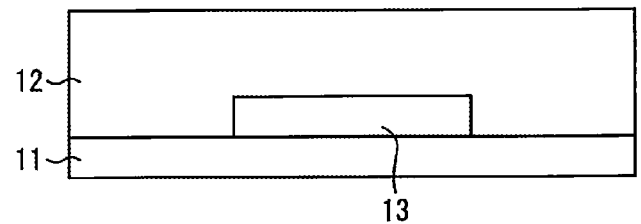
FIG. 12
Figure 12:
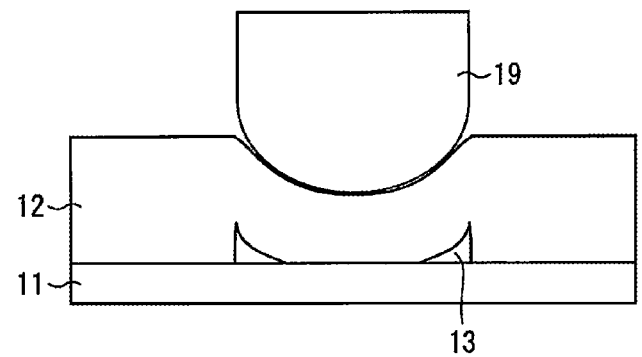

A solution for visualization which solution contains fluorescent beads of 2 μm in diameter was charged from the inlet section 6 into the microchip. After the charging of the solution for visualization was stopped, the microchip was caused to exert its pump function by pressing four microactuators which were provided in the circular flow. From images taken for the fluid by an observation section, it was confirmed that the solution was circulated in the circular flow channel. Specifically, four piezo-driven actuators were each driven for a driving time (interval) of 100 ms, that is, these four piezo-driven actuators were driven at a cycle of 2.5 Hz. Fluorescence microscopy images taken every 3 seconds after a starting time for the observation (t=0 second) are shown in (a) through (c) of FIG. 10. The fluorescence microscopy images shows that, although some of the particles of the fluid are regurgitated, the particles as a whole are moved to the right-hand side of the images. Fluorescent microparticles (cluster of fluorescent microparticles) conspicuously existing in the vicinity of the center of the flow channel were traced to record a velocity of these microparticles, and an approximate flow rate was calculated from a cross-sectional area of the flow channel. The same experiment as above was made with varying driving cycles from 12.5 Hz, which is a driving cycle limit of the piezo-driven actuator, to 0.25 s (interval of 20 ms), and it was found that the flow rate increased substantially in proportion to the driving cycle (FIG. 11). This demonstrates that the on-chip pump operates on the principle of a peristaltic pump. In addition, a maximum flow rate was approximately 1 µL/min, which falls within the range of a flow rate provided by a common microchip (about in the range from 0.01 to 10 µL/min). This demonstrates practicality of the on-chip pump.

With use of a microchip including the on-chip pump described as above and the aforementioned valves, (i) delivery of a solution through a flow channel and (ii) sample manipulation can be locally performed on the glass microchip. With such an arrangement, it is possible to construct a system that eliminates the need for an external pump and external valves and achieves an extremely high degree of integration. Specifically, a system used to occupy most of the space of one desk for experiment can be realized in a palm size. This makes it possible to realize applications of the present invention to, for example, portable medical analyzer, a diagnosis tool, and an environment measuring device all of which are capable of being incorporated into a mobile phone or the like. Further, the present invention can be greatly useful in, for example, environmental analysis by a lipid-liquid system for metal extraction using an organic solvent and a small amount of sample (Y. Kikutani et al., "Circulation microchannel for liquid-liquid microextraction", Microchim Acta 164: 241-247 (2009)), analysis of substances and gas emitted from cells by microfluidic cell culture system using a glass chip (W. Gu et al., Proc. Natl. Acad. Sci. USA 101 (45): 15861-15866 (2004)), and a system for synthesis of an organic molecule with use of trace samples typified by a cell extract and the like.

The present invention is not limited to the aforementioned embodiments and is susceptible of various changes within the scope of the accompanying claims. Also, an embodiment obtained by suitable combinations of technical means disclosed in the different embodiments is also included within the technical scope of the present invention.

All of the academic literatures and patent literatures listed herein are incorporated by reference herein.

The present invention is applicable to various fields including biology, chemistry, medicine, and medical care, as well as micro-nanochemistry.

The present invention enables construction of a microchip entirely made of glass and thus allows for (i) physically/chemically stable fluid manipulation in the microchip and (ii) the use of an organic solvent in the microchip, both of which were not achieved by the conventional microchip using a polymeric material.

The present invention enables construction of a structure having a small dead volume and thus allows for on-chip manipulation and separation of cells and biomolecules. As a result, it is possible to construct (i) a high-speed separation device for ES cells and/or iPS cells and (ii) a high-variety synthesis device for biomolecules and/or organic molecules. Furthermore, the present invention enables on-chip manipulation of a chemical substance.

Specific embodiments or examples implemented in the description of the embodiments only show technical features of the present invention and are not intended to limit the scope of the invention. Variations can be effected within the spirit of the present invention and the scope of the following claims.

What is claimed is:

1. A fluid-controlling device for microchip, the fluid-controlling device comprising:
    a glass substrate and a glass sheet which is 1 µm to 50 µm in thickness; and
    a recessed part provided in the glass substrate having a first opening formed on a top-surface side of the glass substrate, and a first port and a second port configured to serve as a second opening being formed on a bottom of the recessed part, the glass sheet sealing the first opening, wherein
    when a pressing force toward an inside of the recessed part is applied to the glass sheet, a volume of the recessed part is decreased, and when the pressing force is released, the volume of the recessed part is restored, and
    the first port and the second port are located at respective positions to be sealed by the glass sheet when the glass sheet is pressed to the bottom of the recessed part.

2. A microchip comprising:
    a fluid-controlling device according to claim 1; and
    a channel substrate having a first microflow channel and a second microflow channel provided thereon, the first port being joined to an end of the first microflow channel and the second port being joined to an end of the second microflow channel, so that both of the microflow channels are connected with each other through the fluid-controlling device.

3. A microchip system comprising:
    a microchip recited in claim 2; and
    a pressing section that presses the glass sheet toward the inside of the recessed part.

4. The microchip system according to claim 3, wherein the pressing section is a piezo-driven actuator.

* * * * *